United States Patent
Kim et al.

(10) Patent No.: US 10,341,464 B2
(45) Date of Patent: Jul. 2, 2019

(54) MOBILE TERMINAL AND CONTROL METHOD THEREFOR

(71) Applicant: LG ELECTRONICS INC., Seoul (KR)

(72) Inventors: Juhyup Kim, Seoul (KR); Jinyong Jang, Seoul (KR); Soochul Lim, Seoul (KR); Wonkwon Lee, Seoul (KR); Byounghoon Kim, Seoul (KR); Hyeonggyu Kim, Seoul (KR); Gunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 15/529,041

(22) PCT Filed: Jan. 30, 2015

(86) PCT No.: PCT/KR2015/001020
§ 371 (c)(1),
(2) Date: May 23, 2017

(87) PCT Pub. No.: WO2016/085038
PCT Pub. Date: Jun. 2, 2016

(65) Prior Publication Data
US 2017/0257458 A1    Sep. 7, 2017

(30) Foreign Application Priority Data
Nov. 25, 2014    (KR) .................. 10-2014-0165229

(51) Int. Cl.
*H04L 29/08* (2006.01)
*H04W 52/02* (2009.01)
*H04W 88/02* (2009.01)

(52) U.S. Cl.
CPC ....... *H04L 67/325* (2013.01); *H04W 52/0264* (2013.01); *H04W 88/02* (2013.01);
(Continued)

(58) Field of Classification Search
None
See application file for complete search history.

(56) References Cited

U.S. PATENT DOCUMENTS

2008/0259742 A1 * 10/2008 Tadanori .............. G04G 13/021
368/263
2014/0143568 A1 * 5/2014 Kim ..................... G06F 1/3206
713/323
(Continued)

FOREIGN PATENT DOCUMENTS

KR    1020080113419    12/2008
KR    1020110030274    3/2011
(Continued)

OTHER PUBLICATIONS

PCT International Application No. PCT/KR2015/001020, Written Opinion of the International Searching Authority dated Aug. 20, 2015, 13 pages.

*Primary Examiner* — Younes Naji
(74) *Attorney, Agent, or Firm* — Lee, Hong, Degerman, Kang & Waimey

(57) ABSTRACT

A mobile terminal and a control method therefor are disclosed. According to at least one embodiment of the present invention, it is able to provide a mobile terminal capable of reducing consumed power by controlling an alarm period for waking up an application performing synchronization with a server and a method of controlling therefor. Moreover, according to at least one embodiment of the present invention, it is able to provide a solution for controlling an alarm period of an application.

6 Claims, 16 Drawing Sheets

(52) U.S. Cl.
CPC .............. *H04L 67/02* (2013.01); *Y02D 30/40* (2018.01); *Y02D 70/00* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/22* (2018.01); *Y02D 70/26* (2018.01)

(56) References Cited

U.S. PATENT DOCUMENTS

| | | | |
|---|---|---|---|
| 2016/0086479 A1* | 3/2016 | Kang | G08B 25/008 340/501 |
| 2016/0156631 A1* | 6/2016 | Viswanathan | H04L 67/06 726/3 |

FOREIGN PATENT DOCUMENTS

| | | |
|---|---|---|
| KR | 1020110081894 | 7/2011 |
| KR | 1020110092005 | 8/2011 |

\* cited by examiner

FIG. 10

| application | alarm | status |
|---|---|---|
| First application | First alarm | NEW |
| | Second alarm | TARGET |
| Second application | Third alarm | NOMINEE |
| Third application | Fourth alarm | Unknown |

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/001020, filed on Jan. 30, 2015, which claims the benefit of earlier filing date and right of priority to Korean Application No. 10-2014-0165229, filed on Nov. 25, 2014, the contents of which are incorporated by reference herein in its entirety.

TECHNICAL FIELD

The present invention relates to a mobile terminal enabling a user to more conveniently use the mobile terminal and a method of controlling there for.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A mobile terminal is a device which may be configured to perform various functions. Examples of such functions include data and voice communications, capturing images and video via a camera, recording audio, playing music files and outputting music via a speaker system, and displaying images and video on a display.

There are ongoing efforts to support and increase the functionality of mobile terminals. Such efforts include software and hardware improvements, as well as changes and improvements in the structural components which form the mobile terminal Recently, such applications performing synchronization by periodically performing data communication with a server as an SNS (Social Network Service) application, an instant message application, and the like are widely used in a mobile terminal. Although a service is not in use, the applications periodically transceive a packet with the server to update data or periodically transmit a packet to the server to notify that a mobile terminal is connected with the service. Hence, if a lot of applications are installed in the mobile terminal or frequency of synchronization is short, power consumption of the mobile terminal may increase.

DISCLOSURE OF THE INVENTION

Technical Tasks

One object of the present invention is to solve the aforementioned problem and other problem. Another object of the present invention is to provide a mobile terminal capable of reducing consumed power by controlling an alarm period for waking up an application performing synchronization with a server and a method of controlling therefor.

The other object of the present invention is to provide a solution for controlling an alarm period of an application.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a mobile terminal includes a memory configured to store a plurality of applications performing synchronization by waking up in a predetermined alarm period; and a controller operably coupled to the memory and comprising: a data scheduler configured to control the alarm period by determining an alarm time for waking each application up according to a predetermined condition and an alarm service module. The alarm service module configured to wake each application up at the alarm time determined by the data scheduler, receive a first signal for requesting a specific alarm for wakeup from a first application among the plurality of the applications and transmit a second signal including information on the specific alarm to the data scheduler in response to the received first signal. The data scheduler is further configured to determine an alarm time for waking the first application up based on the information on the specific alarm when the specific alarm relates to data communication for transceiving a packet with a server and transmit the determined alarm time for waking the first application up to the alarm service module.

To further achieve these and other advantages and in accordance with the purpose of the present invention, according to a different embodiment, a method of controlling a mobile terminal includes the steps of receiving, by the alarm service module, a first signal for requesting a specific alarm for wakeup from an application performing synchronization by waking up in a predetermined alarm period, transmitting, by the alarm service module, a second signal including information on the specific alarm to the data scheduler in response to the first signal, determining, by the data scheduler, whether the specific alarm is a target of alarm scheduling based on the information on the specific alarm included in the second signal, transmitting, by the data scheduler, a third signal to the alarm service module to indicate that the specific alarm is not the target of alarm scheduling when it is determined that the specific alarm is not the target of alarm scheduling, waking the application up, by the alarm service module, at an alarm time based on the predetermined alarm period in response to the third signal, transmitting, by the alarm service module, a fourth signal to the data scheduler to indicate that the application woke up, monitoring, by the data scheduler, whether data communication for transceiving a packet between the application and a server is performed during a prescribed time in response to the fourth signal and storing, by the data scheduler, the information on the specific alarm of the application by mapping the information on the specific alarm to a monitoring record when the data communication is performed after the application wakes up at the alarm time based on the predetermined alarm period.

Advantageous Effects

Accordingly, the present invention provides the following effects or advantages.

According to at least one embodiment of the present invention, it is able to provide a mobile terminal capable of reducing consumed power by controlling an alarm period for waking up an application performing synchronization with a server and a method of controlling therefor.

According to at least one embodiment of the present invention, it is able to provide a solution for controlling an alarm period of an application.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 10 is a diagram for explaining an example of a mapping data stored by a data scheduler in a mobile terminal according to one embodiment of the present invention;

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
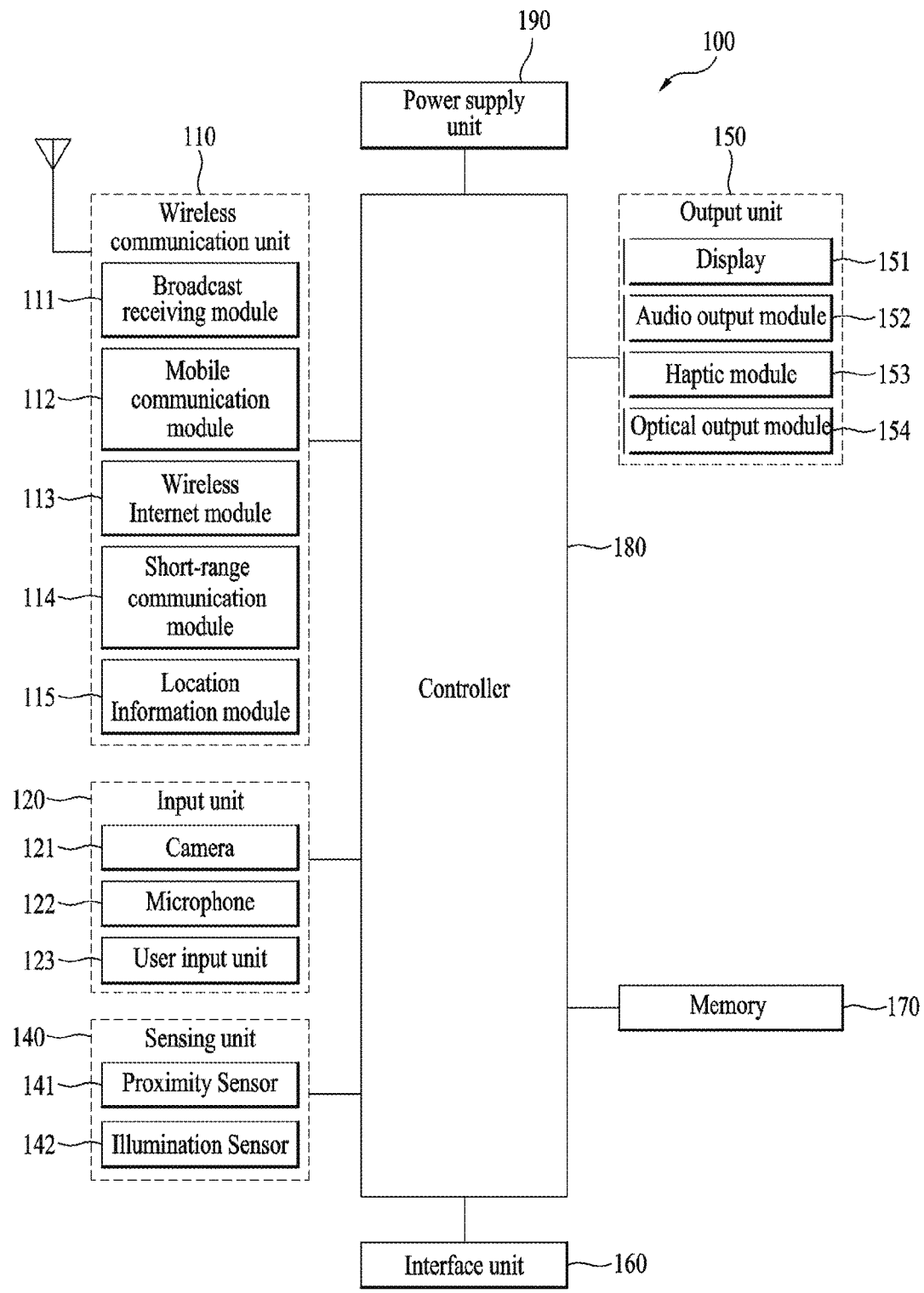
FIG. 1A is a block diagram of a mobile terminal in accordance with the present disclosure.
Figure 1B:
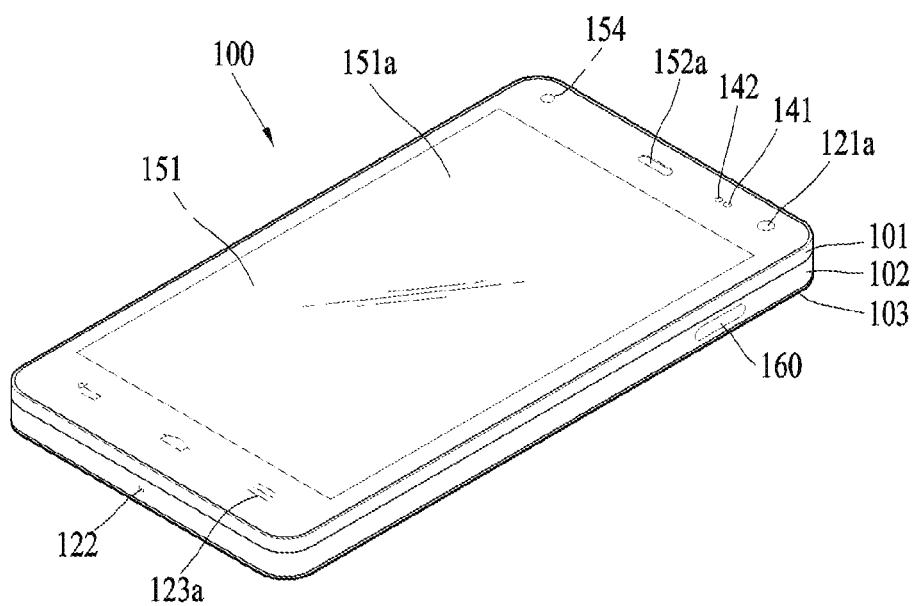
FIGS. 1B and 1C are conceptual views of one example of the mobile terminal, viewed from different directions.
Figure 1C:
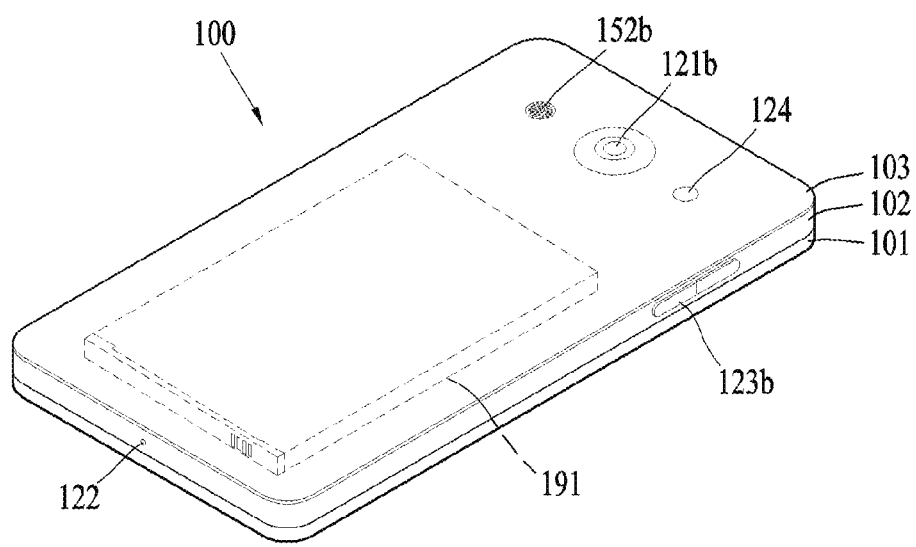

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the configuration elements can operate in a manner of cooperating with each other to implement an operation of a mobile terminal, control of the mobile terminal or a method of controlling the mobile terminal according to various embodiments described in the following. And, the operation of the mobile terminal, the control of the mobile terminal or the method of controlling the mobile terminal can be implemented on the mobile terminal by driving at least one or more application programs stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

A mobile terminal 100 can include a display unit 151, a first and second audio output unit 152a/152b, a proximity sensor 141, an illumination sensor 142, an optical output unit 154, a first and a second camera 121a/121b, a first and a second operation unit 123a/123b, a microphone 122, an interface unit 160 and the like.

In the following, as shown in FIGS. 1B and 1C, assume that the display unit 151, the first audio output unit 152a, the proximity sensor 141, the illumination sensor 142, the optical output unit 154, the first camera 121a, and the first operation unit 123a are deployed at the front side of a terminal body, the second operation unit 123b, the microphone 122, and the interface unit 160 are deployed at the side of the terminal body, and the second audio output unit 152b and the second camera 121b are deployed at the rear side of the terminal body in the mobile terminal 100.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 displays (outputs) information processed in the mobile terminal 100. For example, the display unit 151 can display execution screen information of an application program executed in the mobile terminal 100, UI (user interface) according to the execution screen information, and GUI (graphic user interface) information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver to deliver call sound to an ear of a user. The second audio output module 152b may be implemented in the form of a loud speaker to output various alarm sounds and playback sound of multimedia.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, information processed by a mobile terminal can be displayed using a flexible display. Regarding this, it shall be described in more detail with reference to the attached drawing in the following.

Figure 2:
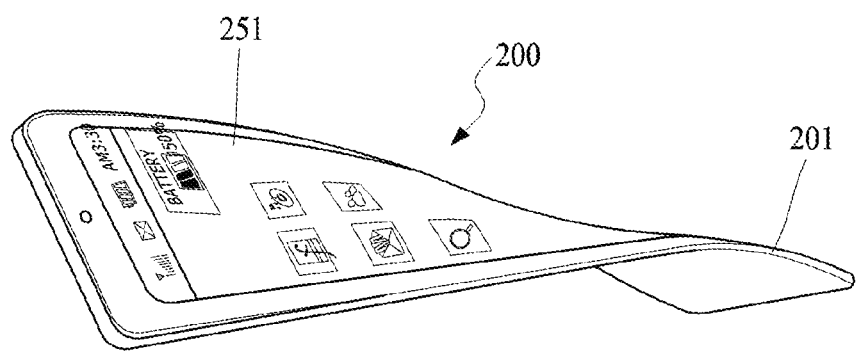
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
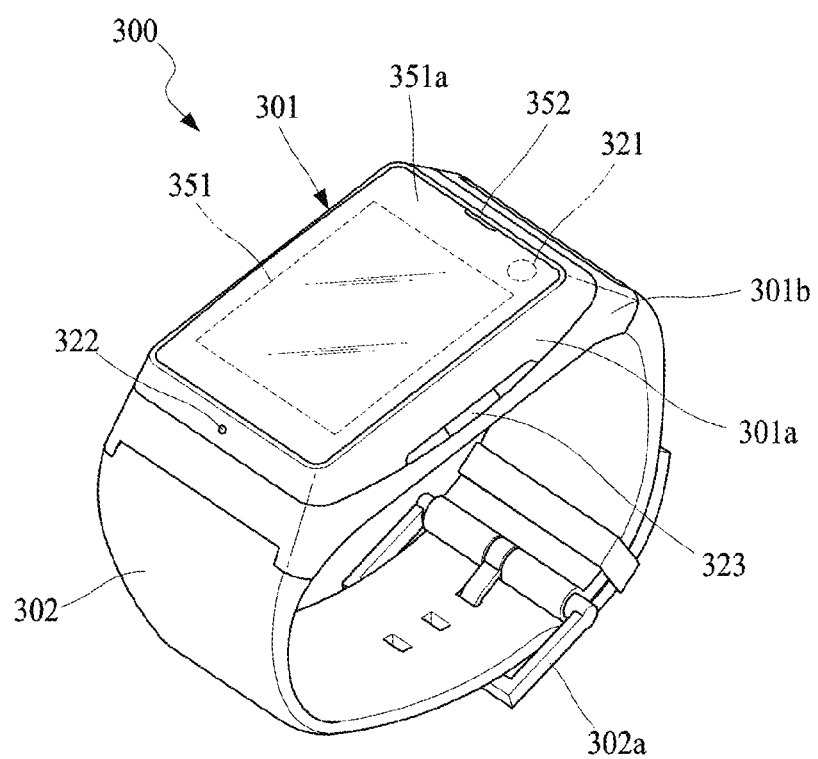
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
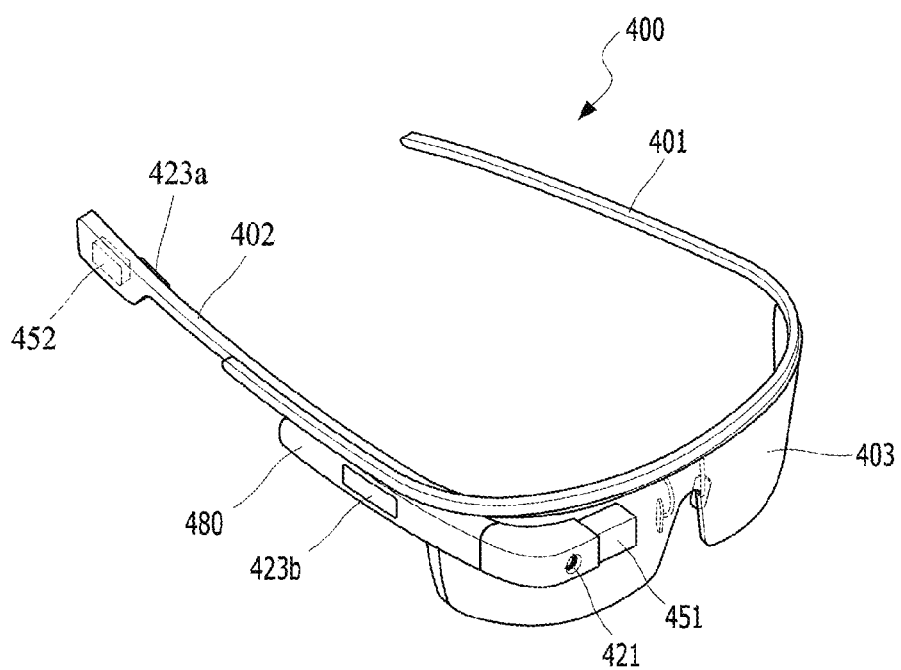
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following, the embodiments of the present invention explain a case that a mobile terminal corresponds to the mobile terminal 100 mentioned earlier in FIGS. 1A to 1C. Yet, depending on an embodiment, the mobile terminal may corresponds to one selected from the group consisting of the mobile terminal 200 in FIG. 2, the mobile terminal 300 in FIG. 3, and the mobile terminal 400 in FIG. 4.

Figure 5:
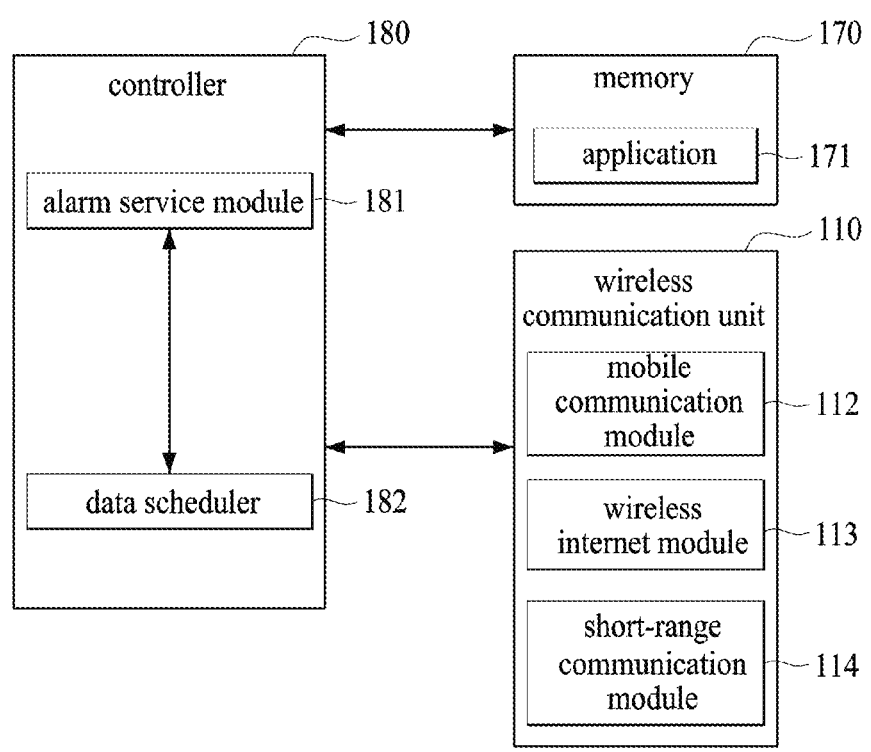
FIG. 5 is a block diagram for a partial configuration module of a mobile terminal according to one embodiment of the present invention.

FIG. 5 is a block diagram for a partial configuration module of a mobile terminal according to one embodiment of the present invention. The configuration modules of the mobile terminal 100 shown in FIG. 5 can be interpreted with reference to FIG. 1A. Depending on an embodiment, a different configuration module can be added to the mobile terminal 100 shown in FIG. 5.

Referring to FIG. 5, the mobile terminal 100 according to one embodiment of the present invention includes a controller 180, a memory 170, and a wireless communication unit 110.

The memory can store an application 171. In FIG. 5, one application 171 is depicted for clarity. Yet, a plurality of applications can be stored in the memory 170. The application 171 may correspond to a native application which is installed at the time of manufacturing the mobile terminal 100 or at the time of upgrading OS/firmware or an application separately downloaded from an external server and installed by a user.

The application 171 wakes up at every predetermined alarm period and synchronizes data by performing data communication with a server. Although a service is not in use, the application 171 periodically transceives a packet with the server to update data or periodically transmits a packet to the server to notify that the mobile terminal 100 is connected with a service. In this case, waking up the application 171 may have a meaning that an idle state of the application is cancelled and the application is activated for data communication.

The controller 180 can include an alarm service module 181 and a data scheduler 182. In FIG. 5, both the alarm service module 181 and the data scheduler 182 are depicted as being installed in the controller 180. Yet, depending on an embodiment, at least one of the alarm service module 181 and the data scheduler 182 can be implemented in a separate memory, the memory 170, or an external memory. The alarm service module 181 and the data scheduler 182 can be implemented at the time of manufacturing the mobile terminal 100 or can be implemented at the time of upgrading OS/firmware.

The alarm service module 181 can wake up the application 171. The application 171 can transmit a first signal requesting an alarm for wakeup to the alarm service module 181 according to a predetermined alarm period. The predetermined alarm period corresponds to a period predetermined to wake up an application for synchronization. For example, the predetermined alarm period can be configured by a developer of the application.

Depending on an embodiment, the application 171 may request an alarm for waking up each service provided by the application 171 to the alarm service module 181. For example, the application 171 requests a first alarm for waking up a first service according to a predetermined first alarm period to the alarm service module 181 and may be able to request a second alarm for waking up a second service according to a predetermined second alarm period to the alarm service module 181. In some cases, the first alarm period may be the same with the second alarm period.

The first signal may include information on the alarm. For example, the information on the alarm can include at least one of first information for identifying the alarm and information on alarm time at which the application 171 wakes up according to a predetermined alarm period related to the alarm.

The alarm service module 181 can wake the application 171 up at the alarm time based on the information on the alarm time included in the first signal. The woke-up application 171 can transmit a packet to an external server via the wireless communication unit 110. The controller 180 can control the wireless communication unit 110 to transmit the packet received from the application 171 to the external server. In this case, the wireless communication unit 110 used for transmitting the packet may correspond to a mobile communication module 112, a wireless internet module 113, or a short-range communication module 114.

When the application 171 wakes up according to a predetermined alarm period and data communication is performed with the external server, if each of applications wakes up at a different period, power consumption of the mobile terminal 100 may increase. According to the embodiments of the present invention, power consumption of the mobile terminal 100 can be reduced in a manner that the data scheduler 182 controls a predetermined alarm period of the application 171 according to a predetermined condition. For example, according to the embodiments of the present invention, if periods of waking two or more applications up are matched, power consumed by the mobile terminal can be reduced based on data synchronization of the applications.

The data scheduler 182 can control an alarm period predetermined for the application 171 by determining alarm time for waking the application 171 up. In particular, the data scheduler 182 can control the alarm period by delaying or advancing the alarm time for waking the application 171 up on the basis of alarm time based on an original alarm period. The data scheduler 182 may control an alarm period of an alarm related to data communication with a server only among various alarms related to the application 171.

A method of scheduling an alarm scheduled by the data scheduler 182 is explained in more detail with reference to FIG. 6 in the following.

Figure 6:
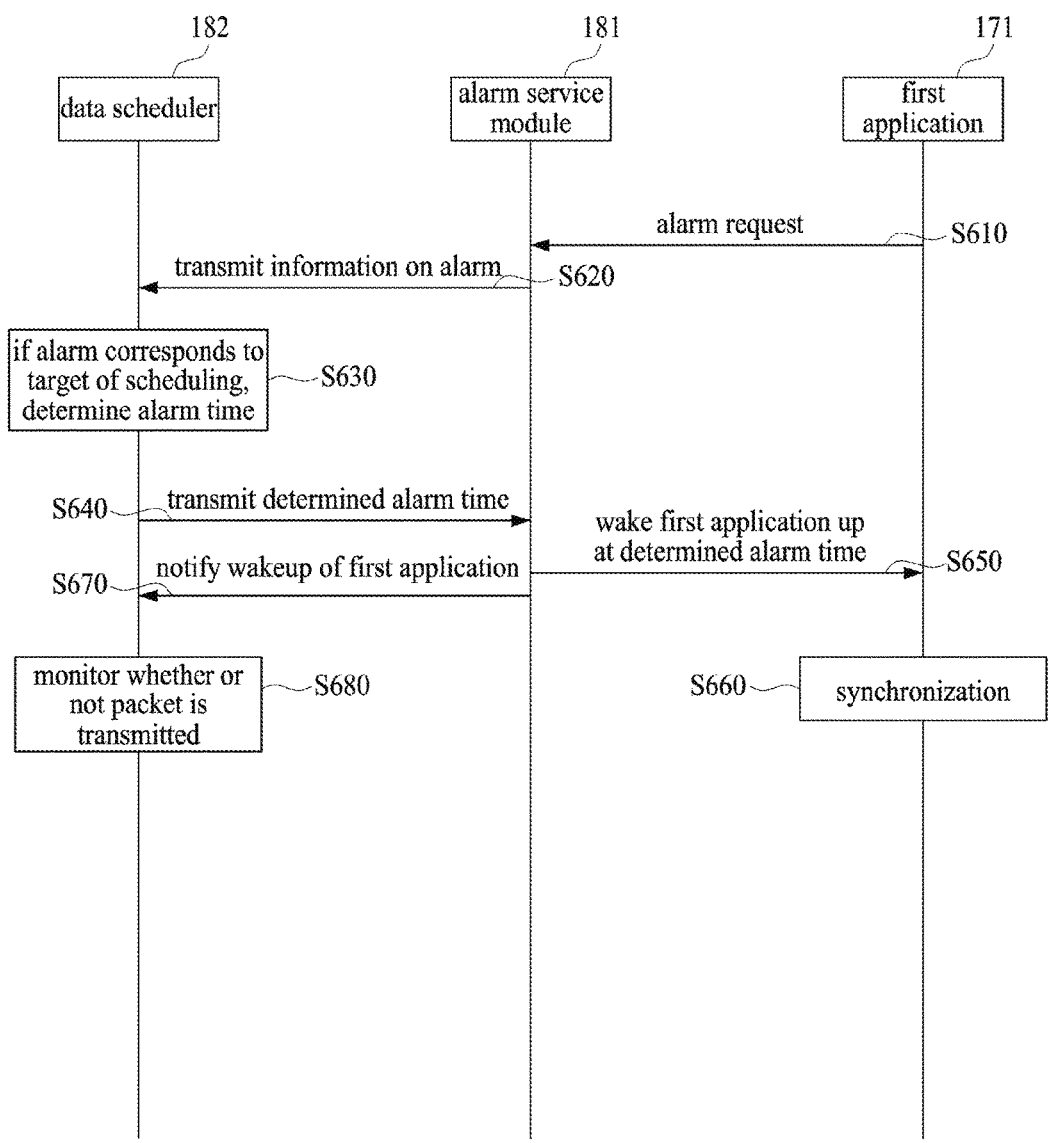
FIG. 6 is a flowchart of an example for a method of controlling a predetermined alarm period of an application in a mobile terminal according to one embodiment of the present invention.

FIG. 6 is a flowchart of an example for a method of controlling a predetermined alarm period of an application in a mobile terminal according to one embodiment of the present invention. A method of controlling an alarm period of an application in the mobile terminal 100 according to one embodiment of the present invention is described in the following with reference to FIGS. 5 and 6. In the present embodiment, for clarity, an application configured to perform synchronization by performing data communication with a server in every predetermined alarm period is referred to as a first application 171.

The first application 171 transmits a first signal for requesting a specific alarm to the alarm service module 181 [S610]. For example, the specific alarm may correspond to an alarm related to a random service among various services provided by the first application 171. The first signal can include information on the specific alarm. For example, the information on the specific alarm can include at least one of first information for identifying the specific alarm and information on alarm time at which the first application 171 wakes up according to a predetermined alarm period related to the specific alarm.

The alarm service module 181 transmits a second signal including the information on the specific alarm to the data scheduler 182 in response to the first signal.

If the specific alarm corresponds to a target of alarm scheduling, the data scheduler 182 determines alarm time for waking the first application 171 up using the specific alarm according to a predetermined condition [S630]. A method for the data scheduler 182 to determine whether or not the specific alarm corresponds to a target of alarm scheduling shall be described later in detail with reference to FIGS. 8 to 13. In the present embodiment, as mentioned in the following description with reference to FIGS. 8 to 13, assume that the method starts from the step S610 after the specific alarm of the first application 171 becomes a target of alarm scheduling.

The data scheduler 182 can control the predetermined alarm period by delaying or advancing the alarm time for waking the first application 171 up using the specific alarm on the basis of alarm time according to the predetermined alarm period according to a predetermined condition. A method for the data scheduler 182 to control the predetermined alarm period shall be described later in detail with reference to FIG. 7 in the following.

The data scheduler 182 transmits a third signal including the determined alarm time to the alarm service module 181 [S640].

The alarm service module 181 wakes the first application 171 up at the determined alarm time in response to the third signal [S650].

The first application 171 is woke up by the alarm service module 181 using the specific alarm and transmits a packet to a server to notify that the mobile terminal 100 is connected with a corresponding service. Or, the first application can perform data synchronization by transceiving data with the server [S650]. The controller 180 can control the wireless communication unit 110 to transmit the packet received from the woke-up first application 171 to the server.

Meanwhile, the alarm service module 181 transmits a fourth signal to the data scheduler 182 to indicate that the first application 171 woke up by the specific alarm [S670]. The step S670 is performed after the step S650, is simultaneously performed together with the step S650, or can be performed with the step S650 in a manner of being partly overlapped in time.

The data scheduler 182 monitors whether or not data communication for transceiving a packet between the first application 171 and the server is performed in response to the fourth signal [S680]. The data scheduler 182 is able to monitor whether or not the first application transmits a packet to the server or whether or not the first application 171 receives a packet from the server via the wireless communication unit 110 during a predetermined time after the fourth signal is received, i.e., during a prescribed time after the first application 171 woke up at the alarm time in response to the third signal.

After the first application 171 woke up, if data communication is performed between the first application 171 and the server, the data scheduler 182 can store the information on the specific alarm in a manner of mapping the information to a monitoring record. In this case, the information on the specific alarm may correspond to first information capable of identifying the specific alarm. The monitoring record information stored in the data scheduler 182 can be used for determining whether or not the specific alarm becomes a target of alarm scheduling in the future.

Depending on an embodiment, the step S680 or the steps S670 and S680 can be omitted. Regarding this, it shall be described later with reference to FIG. 12.

Figure 7:
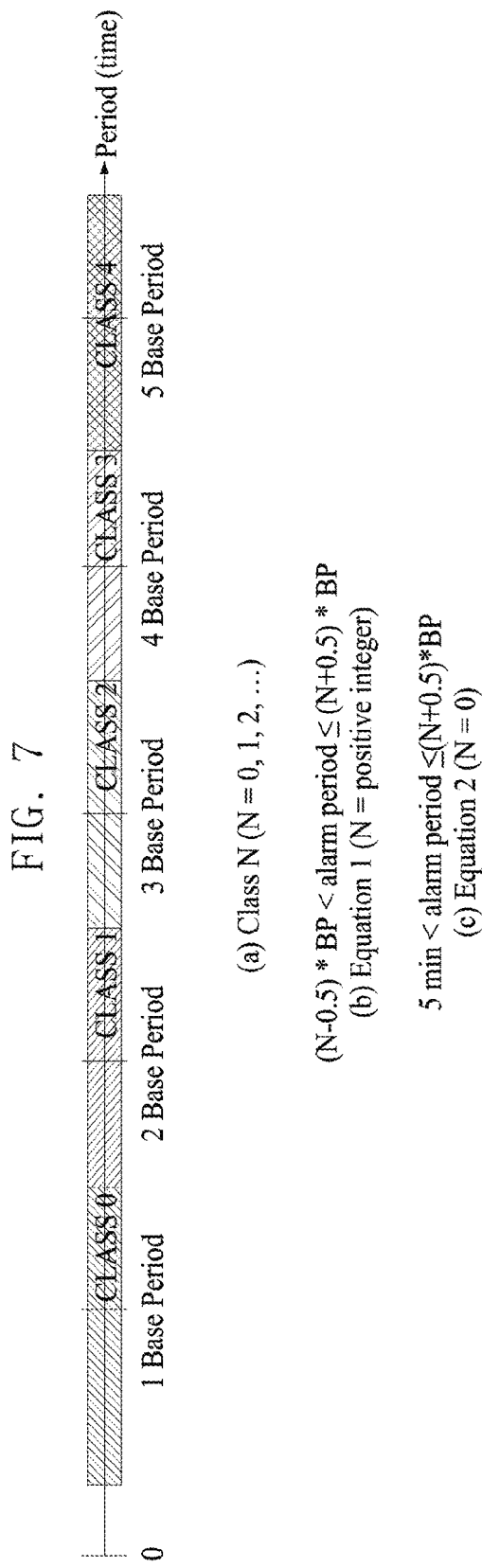
FIG. 7 is a diagram for explaining an example for a method of controlling a predetermined alarm period of an application in a mobile terminal according to one embodiment of the present invention.

FIG. 7 is a diagram for explaining an example for a method of controlling a predetermined alarm period of an application in a mobile terminal according to one embodiment of the present invention.

If an alarm of an application becomes a target of alarm scheduling, the data scheduler 182 can determine an alarm time for waking the application up according to a predetermined condition. The data scheduler 182 can determine alarm time to make each of applications related to the alarm, which becomes the target of alarm scheduling, wake up in every period of an integer multiple of a predetermined base period (BP). The base period (BP) can be determined in consideration of a predetermined alarm period of an application, efficiency of the mobile terminal 100, and the like.

Specifically, if there are a plurality of applications related to the alarm that becomes a target of alarm scheduling, the data scheduler 182 classifies a plurality of the applications into an application belonging to class N (N=0, 1, 2, . . . ) based on the base period (BP) and a predetermined alarm period of each application and determines alarm time of each application to make applications belonging to the same class to wake up at the same period.

FIG. 7 (a) shows a relation between a base period and a class for identifying an application and FIGS. 7 (b) and (c) show equations for determining a class (N) of each application. A method for the data scheduler 182 to control an alarm period is explained with an example of the first application mentioned earlier in FIG. 6.

If a specific alarm of the first application 171 becomes a target of alarm scheduling, the data scheduler 182 determines a class to which the first application 171 belongs thereto based on equation 1 shown in FIG. 7 (b). For example, if a predetermined alarm period of the first application 171 corresponds to 40 minutes and a base period corresponds to 15 minutes, according to the equation 1 shown in FIG. 7 (b), the first application 171 may correspond to an application belonging to class 2.

Depending on an embodiment, if the first application 171 belongs to class 0, the first application 171 may satisfy equation 2 shown in FIG. 7 (c). For example, in case of an application having an alarm period less than 5 minutes, a class may not be classified and a procedure of determining new alarm time determined by the data scheduler 182 can be omitted. It may be able to configure an application having an alarm period less than 5 minutes to perform synchronization according to an original alarm period to maintain a unique function of the alarm. In this case, such a time as 5 minutes is just an example only. A minimum alarm period for making an alarm scheduling target may vary depending on an embodiment.

If the first application 171 belongs to the class 2, the data scheduler 182 can determine alarm time to make the first application 171 wake up in every period of an integer multiple of the base period (BP). For example, the data scheduler 182 can determine alarm time to make the first application 171 wake up in every period of (N+1)*BP. In particular, if the BP corresponds to 15 minutes and the first application 171 belongs to the class 2, the data scheduler 182 can determine alarm time to make the first application 171 wake up in every 45 minute.

According to the present embodiment, since applications belonging to the same class wake up with the same period and applications belonging to a different class wake up based on the base period according to a class to which each application belongs thereto, it is able to reduce power consumed in the mobile terminal 100 due to the wakeup of the application and data communication.

In the following, a method of determining whether or not a specific alarm of an application becomes a target of alarm scheduling is explained with reference to FIGS. 8 to 13. According to one embodiment of the present invention, after an application is woke up by a specific alarm, the data scheduler 182 monitors whether or not data communication for transmitting and receiving a packet is performed via the wireless communication unit 110. Based on a result of the monitoring, the data scheduler learns information on the specific alarm. By doing so, the data scheduler can determine whether or not the specific alarm of the application become a target of alarm scheduling.

Figure 8:
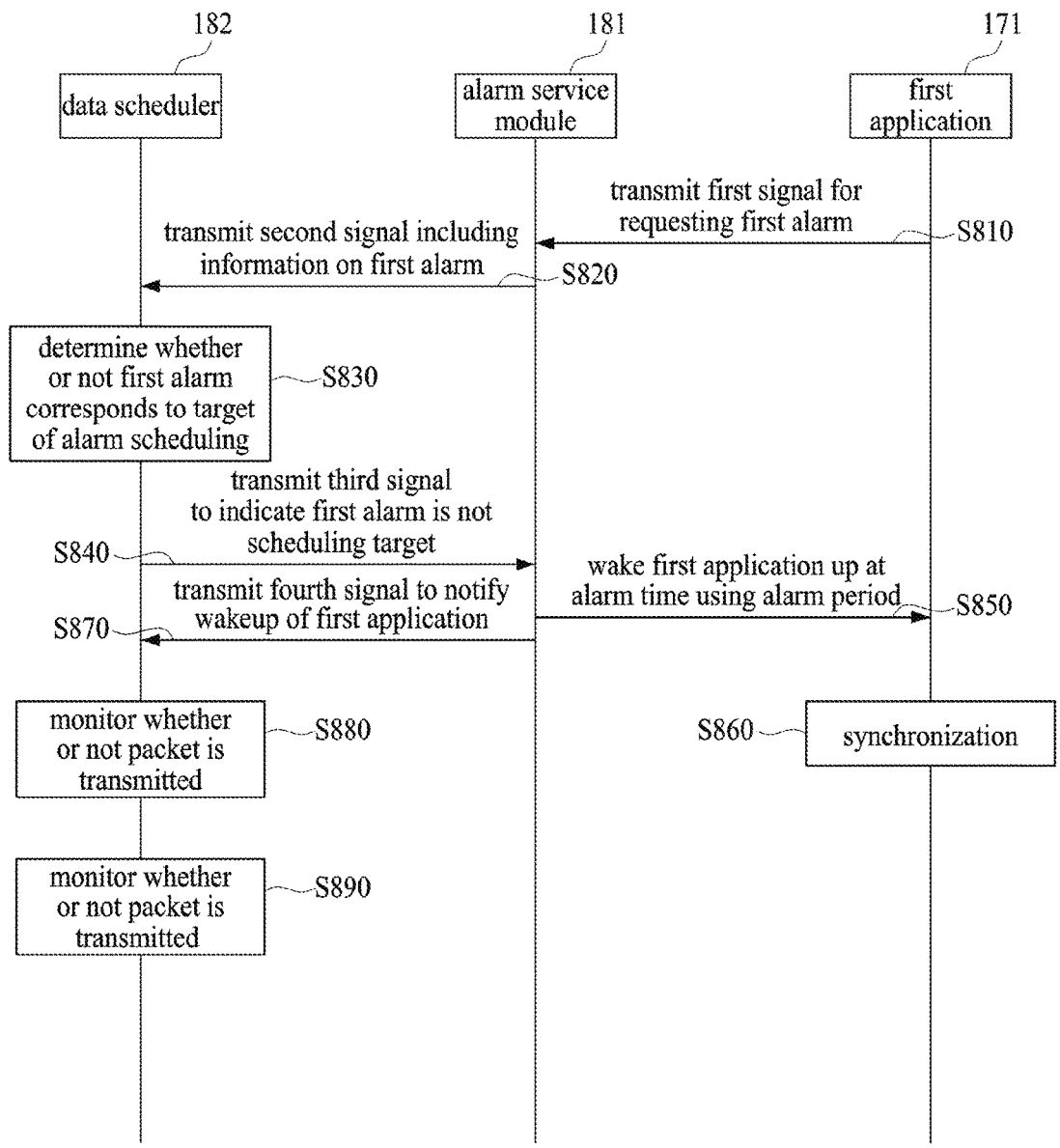
FIG. 8 is a flowchart for a method of determining whether or not a specific alarm of an application becomes a target of alarm scheduling in a mobile terminal according to one embodiment of the present invention.

FIG. 8 is a flowchart for a method of determining whether or not a specific alarm of an application becomes a target of alarm scheduling in a mobile terminal according to one embodiment of the present invention. In the present embodiment, for clarity, an application configured to perform synchronization by performing data communication with a server in every predetermined alarm period is referred to as a first application 171.

The first application 171 transmits a first signal for requesting a first alarm to the alarm service module 181 [S810]. The first signal can include information on the first alarm. For example, the information on the first alarm can include at least one of first information for identifying the first alarm and information on alarm time at which the first application 171 wakes up according to a predetermined alarm period related to the first alarm.

The alarm service module 181 transmits a second signal including the information on the first alarm to the data scheduler 182 in response to the first signal.

The data scheduler determines whether or not the first alarm becomes a target of alarm scheduling [S830]. The data scheduler 182 can determine whether or not the first alarm becomes a target of alarm scheduling based on a monitoring record stored in the data scheduler 182 in advance in a manner of being mapped to the information on the first alarm. In this case, the monitoring record may correspond to a record of monitoring whether or not the first application 171 performs data communication with a server monitored by the data scheduler 182 after the first application 171 is woke up by the first alarm before the step S810 is performed. For example, determining whether or not the first alarm becomes a target of alarm scheduling based on the monitoring record stored in the data scheduler 182 in advance in a manner of being mapped to the information on the first alarm may correspond to checking a status assigned to the first alarm by the data scheduler 182. The step S930 shall be described in more detail with reference to FIGS. 9 and 10.

If the first alarm is not a target of alarm scheduling, the data scheduler 182 transmit a third signal to the alarm service module 181 to indicate that the first alarm is not the target of alarm scheduling [S840]. Since the first alarm is not the target of alarm scheduling, the data scheduler 182 does not change an alarm period predetermined for the first alarm.

The alarm service module 181 wakes the first application 171 up at alarm time in the alarm period predetermined for the first alarm [S850]. In particular, if it reaches at the alarm time according to the predetermined alarm period, the alarm service module 181 can wake the first application 171 up based on the information on the first alarm included in the first signal.

The first application 171 is woke up by the alarm service module 181 using the first alarm and transmits a packet to a server to notify that the mobile terminal 100 is connected with a corresponding service. Or, the first application can perform data synchronization by transceiving data with the server [S860].

Meanwhile, the alarm service module 181 transmits a fourth signal to the data scheduler 182 to indicate that the first application 171 woke up by the first alarm [S870]. The step S870 is performed after the step S850, is simultaneously performed together with the step S850, or can be performed with the step S850 in a manner of being partly overlapped in time.

The data scheduler 182 monitors whether or not data communication for transceiving a packet between the first application 171 and the server is performed in response to the fourth signal [S880]. The data scheduler 182 is able to monitor whether or not the first application transmits a packet to the server or whether or not the first application 171 receives a packet from the server via the wireless communication unit 110 during a predetermined time after the fourth signal is received, i.e., during a prescribed time after the first application 171 woke up at the alarm time in response to the third signal.

After the first application 171 woke up, if data communication is performed between the first application 171 and the server, the data scheduler 182 can store the information on the first alarm in a manner of mapping the information to a monitoring record [S890]. In this case, the information on the first alarm may correspond to first information capable of identifying the first alarm.

After the first application 171 woke up, if data communication is performed between the first application 171 and the server, the data scheduler 182 detects a match-event for the first alarm of the first application 171 and may be then able to provide a prescribed status to the information on the first alarm based on the monitoring record information which is stored in the data scheduler 182 in a manner of being mapped to the information on the first alarm of the first application. In this case, the match-event may correspond to an event that data communication is performed between an application and a server after a specific alarm wakes the application up. When the data scheduler 182 detects a match-event, a method for the data scheduler 182 to provide a prescribed status to an alarm of an application shall be described later in more detail with reference to FIGS. 9 and 10.

Depending on an embodiment, if the first alarm is not the target of alarm scheduling, the alarm service module 181 is able to preferentially know that the first alarm is not the target of alarm scheduling. Hence, the steps S830 and S840 may not be performed.

Figure 9:
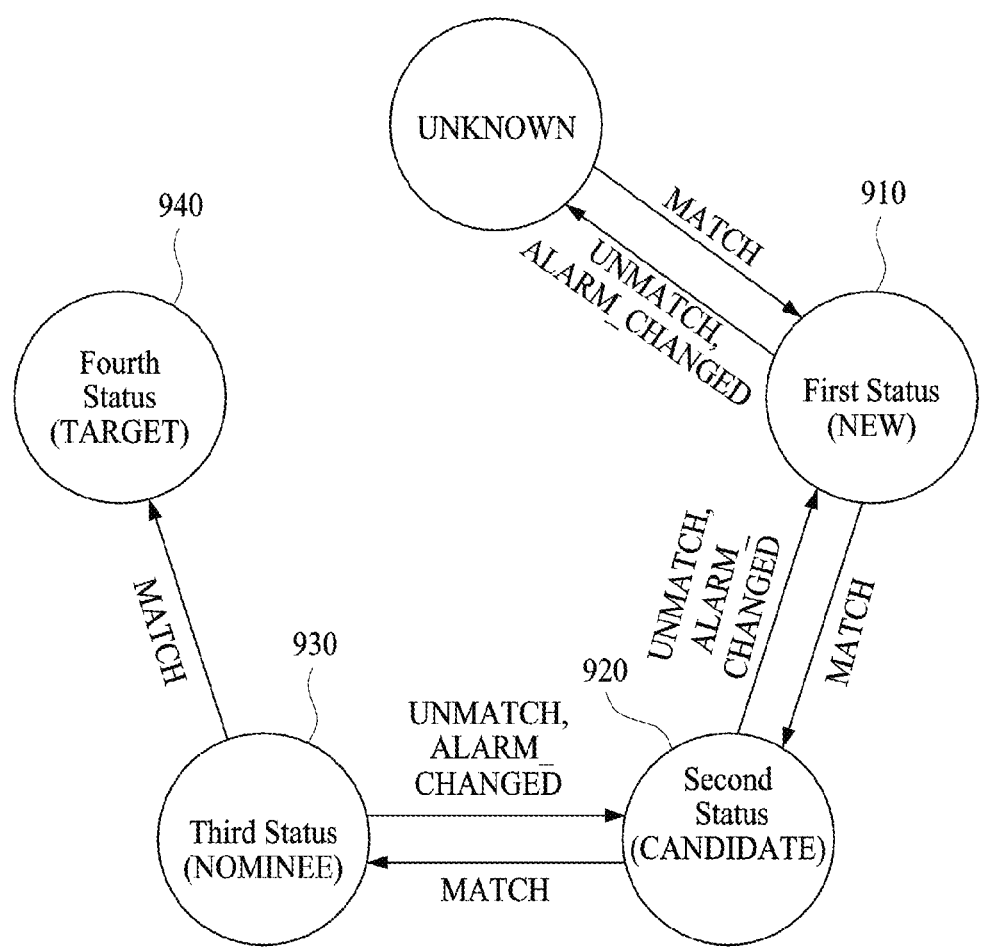
FIG. 9 is a diagram for explaining a status provided to an alarm in case of determining whether or not the alarm of an application becomes a target of alarm scheduling in a mobile terminal according to one embodiment of the present invention.

FIG. 9 is a diagram for explaining a status provided to an alarm in case of determining whether or not the alarm of an application becomes a target of alarm scheduling in a mobile terminal according to one embodiment of the present invention. In the present embodiment, a first alarm of a first application 171 is explained as an example.

If a match-event for the first alarm of the first application 171 is detected, the data scheduler 182 maps the match-event to information on the first alarm of the first application 171 and may be then able to provide a prescribed status to the information on the first alarm based on monitoring record information stored in the data scheduler 182 in advance. The data scheduler 182 can store the information on the first alarm and the provided status by mapping the information to the status.

Specifically, the data scheduler 182 maps a match-event to the information on the first alarm of the first application 171 to find out whether or not there is monitoring record information stored in the data scheduler 182. If there is no monitoring record information stored in the data scheduler 182, the data scheduler can provide a first status 910 to the information on the first alarm.

If the data scheduler 182 maps a match-event to the information on the first alarm of the first application 171 and finds out a record that the data scheduler 182 has detected a match-event for the information on the first alarm of the first application 171 one time based on the monitoring record stored in the data scheduler 182, the data scheduler can provide a second status 920 to the information on the first alarm. In particular, the data scheduler 182 can change the status provided to the information on the first alarm with a one-step higher status. Depending on an embodiment, the data scheduler may provide the second status to the information on the first alarm only when the record of detecting the match-event one time for the first alarm of the first application 171 is recorded immediately before the currently detected match-event.

Or, if the data scheduler 182 maps a match-event to the information on the first alarm of the first application 171 and finds out a record that the data scheduler 182 has detected a match-event for the information on the first alarm of the first application 171 two times in a row based on the monitoring record stored in the data scheduler 182, the data scheduler can provide a third status 920 to the information on the first alarm. In particular, the data scheduler 182 can change the status provided to the information on the first alarm with a one-step higher status. Depending on an embodiment, the data scheduler may provide the third status to the information on the first alarm only when the record of detecting the match-event two times time in a row for the first alarm of the first application 171 is recorded immediately before the currently detected match-event.

Or, if the data scheduler 182 maps a match-event to the information on the first alarm of the first application 171 and finds out a record that the data scheduler 182 has detected a match-event for the information on the first alarm of the first application 171 three times in a row based on the monitoring record stored in the data scheduler 182, the data scheduler can provide a fourth status 920 to the information on the first alarm. In particular, the data scheduler 182 can change the status provided to the information on the first alarm with a one-step higher status. Depending on an embodiment, the data scheduler may provide the fourth status to the information on the first alarm only when the record of detecting the match-event tree times in a row for the first alarm of the first application 171 is recorded immediately before the currently detected match-event.

When the data scheduler 182 determines whether or not the first alarm corresponds to a target of alarm scheduling, the data scheduler can check a prescribed status provided to information on the first alarm. If no status is provided to the information on the first alarm (unknown) or a first status or a second status is provided to the information on the first alarm, it is able to determine that the first alarm is not the target of alarm scheduling. On the contrary, when the data scheduler 182 determines whether or not the first alarm corresponds to a target of alarm scheduling, if a third status or a fourth status is provided to the information on the first alarm, it is able to determine that the first alarm is the target of alarm scheduling.

Meanwhile, when the status provided to the information on the first alarm corresponds to the first status 910 and the first alarm wakes the first application 171 up, if the data scheduler 182 monitors whether or not data communication for transceiving a packet between the first application 171 and a server is performed and it is determined as the data communication is not performed (i.e., if match-event is not detected), the data scheduler 182 is able to cancel the first status 910 provided to the information on the first alarm.

Or, when the status provided to the information on the first alarm corresponds to the second status 920 and the first alarm wakes the first application 171 up, if the data scheduler 182 monitors whether or not data communication for transceiving a packet between the first application 171 and a server is performed and it is determined as the data communication is not performed (i.e., if match-event is not detected), the data scheduler 182 is able to cancel the second status 920 provided to the information on the first alarm and provide the first status 910 to the information on the first alarm.

Or, when the status provided to the information on the first alarm corresponds to the third status 930 and the first alarm wakes the first application 171 up, if the data scheduler 182 monitors whether or not data communication for transceiving a packet between the first application 171 and a server is performed and it is determined as the data communication is not performed (i.e., if match-event is not detected), the data scheduler 182 is able to cancel the third status 930 provided to the information on the first alarm and provide the second status 920 to the information on the first alarm.

Or, when the status provided to the information on the first alarm corresponds to the fourth status 940 and the first alarm wakes the first application 171 up, the data scheduler 182 may not monitor whether or not data communication for transceiving a packet between the first application 171 and a server is performed. Although the data scheduler 182 monitors whether or not data communication for transceiving a packet between the first application 171 and a server is performed, the data scheduler 182 is able to maintain the fourth status 940 provided to the information on the first alarm as it is. In particular, if a status provided to the information on the first alarm corresponds to the fourth status 940, the first alarm may become a target of alarm scheduling irrespective of whether or not a next match-event for the first alarm is detected. Regarding this, it shall be described in more detail with reference to FIGS. 11 to 13.

Or, depending on an embodiment, after the first status to the third status 910 to 930 is provided to the information on the first alarm, if a predetermined alarm period included in the information on the first alarm transmitted from the first application is changed from a predetermined alarm period stored in the data scheduler 182, the data scheduler 182 can change the status provided to the information on the first alarm with one-step lower status.

In the step S830 mentioned earlier in FIG. 8, the data scheduler 182 can determine whether or not the first alarm corresponds to a target of alarm scheduling by checking the status provided to the information on the first alarm. In the step S830, since the first alarm is not the target of alarm scheduling, there is no status provided to the information on the first alarm (unknown) or the status provided to the information on the first alarm may correspond to the first status 910 or the second status 820.

In the step S890 mentioned earlier in FIG. 8, if there is no status provided to the information on the first alarm (unknown), the data scheduler 182 can provide the first status 910 to the information on the first alarm. If the status provided to the information on the first alarm corresponds to the first status 910, the data scheduler can provide the second status 920 to the information on the first alarm.

The aforementioned first status to the fourth status is just an example only. The number of statuses capable of being provided to the information on the first alarm, contents of status, change of status, and the like may vary depending on an embodiment.

FIG. 10 is a diagram for explaining an example of a mapping data stored by a data scheduler in a mobile terminal according to one embodiment of the present invention.

The data scheduler 182 can store information on each alarm and information on a status provided to information on each alarm by mapping the information according to an application. The data scheduler 182 can include a memory area in the inside of the data scheduler or may store the mapping data in a separate memory area under the control of the controller 180. In order to determine whether or not an alarm of each application becomes a target of alarm scheduling, the data scheduler 182 can store not only information on an alarm of an application for data communication, but also information on an alarm (e.g., fourth alarm of third application) of an application irrelevant to data communication.

Figure 11:
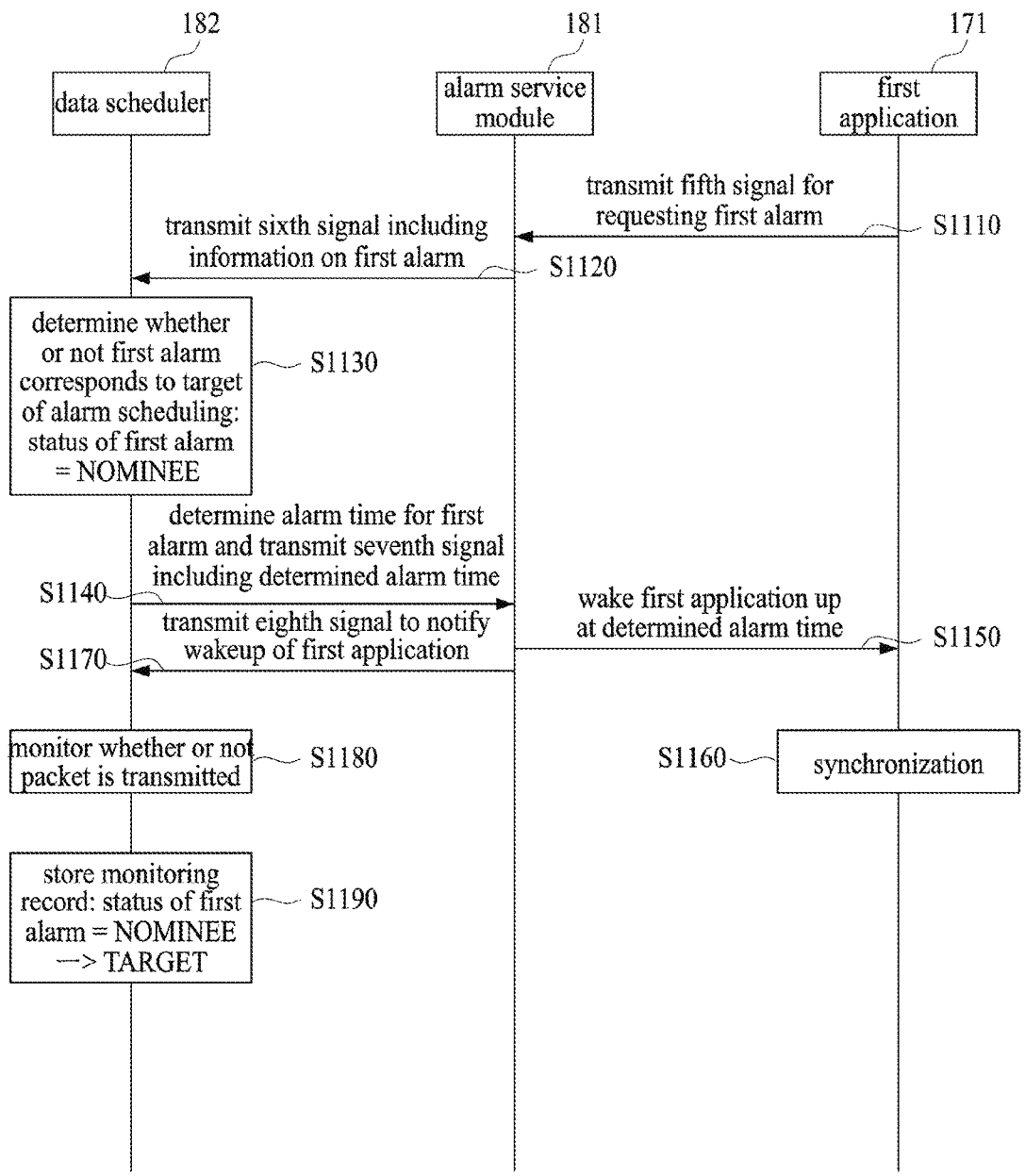
FIG. 11 is a flowchart for explaining an example of an embodiment capable of being performed after the embodiment of FIG. 8 in a mobile terminal according to one embodiment of the present invention.

FIG. 11 is a flowchart for explaining an example of an embodiment capable of being performed after the embodiment of FIG. 8 in a mobile terminal according to one embodiment of the present invention.

The first application 1717 transmits a fifth signal for requesting a first alarm to the alarm service module 181 [S1110]. The fifth signal can include information on the first alarm. For example, the information on the first alarm can include at least one of first information for identifying the first alarm and information on alarm time at which the first application 171 wakes up according to a predetermined alarm period related to the first alarm.

The alarm service module 181 transmits a sixth signal including the information on the first alarm to the data scheduler 182 in response to the fifth signal [S1120]

The data scheduler 182 determines whether or not the first alarm becomes a target of alarm scheduling [S1130]. The data scheduler 182 can determine whether or not the first alarm becomes a target of alarm scheduling based on a monitoring record stored in the data scheduler 182 in advance in a manner of being mapped to the information on the first alarm. For example, the data scheduler 182 checks a status provided to the information on the first alarm to determine whether or not the first alarm becomes a target of alarm scheduling. In the present embodiment, assume that the status provided to the information on the first alarm corresponds to a third status 930 (NOMINEE). As mentioned earlier in FIG. 9, an alarm corresponding to the third status 930 can be a target of alarm scheduling.

The data scheduler 182 determines alarm time for waking the first application 171 up using the first alarm and transmits a seventh signal including the determined alarm time to the alarm service module 181 [S1140].

The data scheduler 182 determine a class to which the first application belongs thereto among classes N (N=0, 1, 2, . . . ) based on a predetermined base period (BP) and an alarm period predetermined for the first alarm and may be then able to determine alarm time to make the first application 171 wake up in every period of an integer multiple of the base period (BP) based on the determined class. Since the method for the data scheduler 182 to determine alarm time is mentioned earlier in FIG. 7, detail explanation is omitted at this time.

If it reaches at the determined alarm time, the alarm service module 181 can wake the first application 171 up in response to the seventh signal [S1150].

The first application 171 is woke up by the alarm service module 181 using the first alarm and transmits a packet to a server to notify that the mobile terminal 100 is connected with a corresponding service. Or, the first application can perform data synchronization by transceiving data with the server [S1160].

Meanwhile, the alarm service module 181 transmits an eighth signal to the data scheduler 182 to indicate that the first application 171 woke up by the first alarm [S1170]. The step S1170 is performed after the step S1150, is simultaneously performed together with the step S1150, or can be performed with the step S1150 in a manner of being partly overlapped in time.

The data scheduler 182 monitors whether or not data communication for transceiving a packet between the first application 171 and the server is performed in response to the eighth signal [S1180]. The data scheduler 182 is able to monitor whether or not the first application transmits a packet to the server or whether or not the first application 171 receives a packet from the server via the wireless communication unit 110 during a predetermined time after the eighth signal is received, i.e., during a prescribed time after the first application 171 woke up at the alarm time in response to the seventh signal.

After the first application 171 woke up, if data communication is performed between the first application 171 and the server, the data scheduler 182 can store the information on the first alarm in a manner of mapping the information to a monitoring record [S1190]. In this case, the information on the first alarm may correspond to first information capable of identifying the first alarm.

After the first application 171 woke up, if data communication is performed between the first application 171 and the server, the data scheduler 182 detects a match-event for the first alarm of the first application 171 and may be then able to provide a prescribed status to the information on the first alarm based on the monitoring record information which is stored in the data scheduler 182 in a manner of being mapped to the information on the first alarm of the first application. In the present embodiment, since the monitoring record information, which is stored in the data scheduler 182 in a manner of being mapped to the information on the first alarm of the first application, corresponds to information indicating that the third status 930 is provided to the information on the first alarm, the data scheduler 182 can provide a fourth status 940 (TARGET) to the information on the first alarm.

Figure 12:
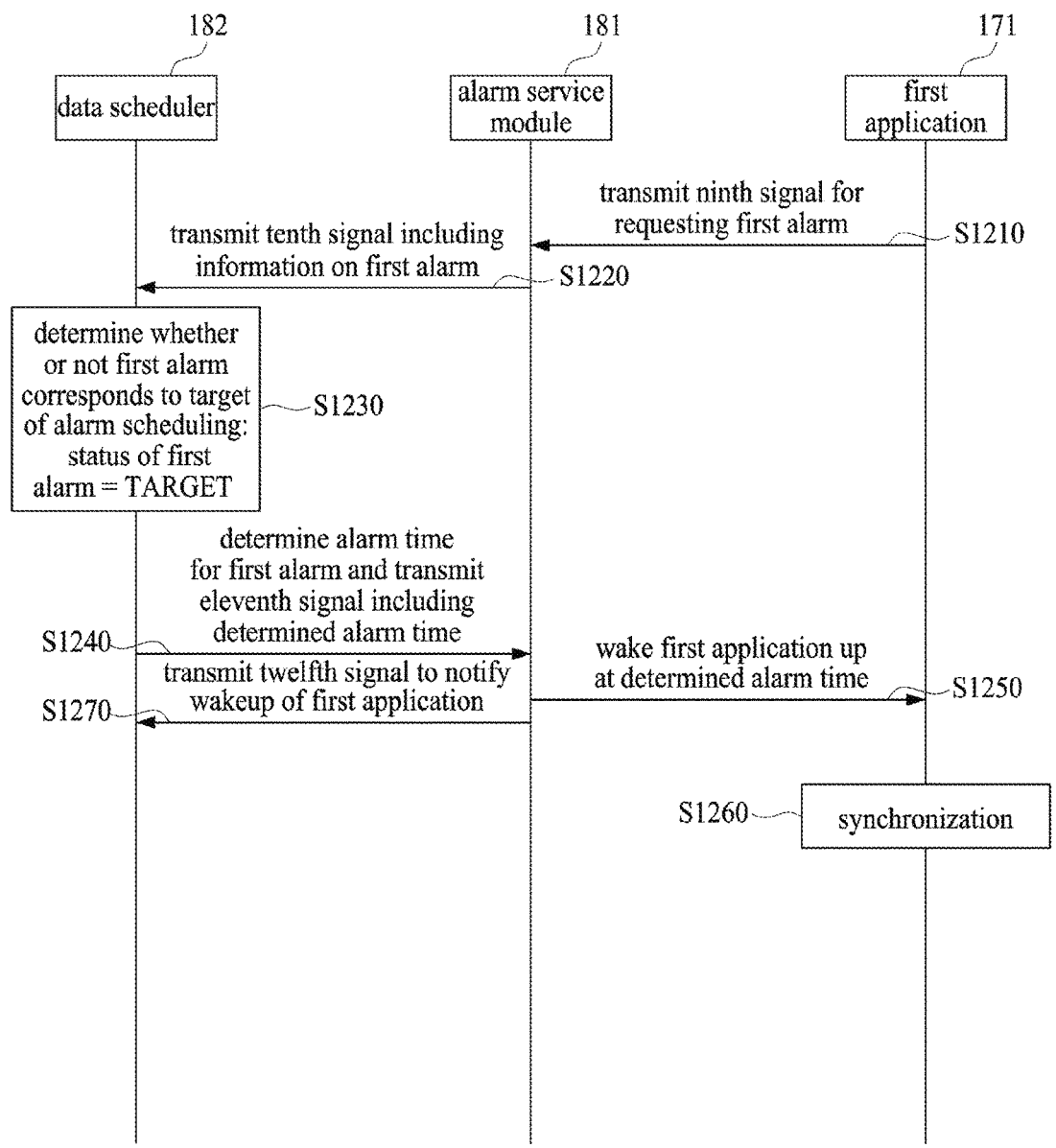
FIG. 12 is a flowchart for explaining an example of an embodiment capable of being performed after the embodiment of FIG. 11 in a mobile terminal according to one embodiment of the present invention.

FIG. 12 is a flowchart for explaining an example of an embodiment capable of being performed after the embodiment of FIG. 11 in a mobile terminal according to one embodiment of the present invention.

The first application 1717 transmits a ninth signal for requesting a first alarm to the alarm service module 181 [S1210]. The ninth signal can include information on the first alarm. For example, the information on the first alarm can include at least one of first information for identifying the first alarm and information on alarm time at which the first application 171 wakes up according to a predetermined alarm period related to the first alarm.

The alarm service module 181 transmits a tenth signal including the information on the first alarm to the data scheduler 182 in response to the ninth signal [S1220]

The data scheduler 182 determines whether or not the first alarm becomes a target of alarm scheduling [S1230]. The data scheduler 182 can determine whether or not the first alarm becomes a target of alarm scheduling based on a monitoring record stored in the data scheduler 182 in advance in a manner of being mapped to the information on the first alarm. For example, the data scheduler 182 checks a status provided to the information on the first alarm to determine whether or not the first alarm becomes a target of alarm scheduling. In the present embodiment, assume that the status provided to the information on the first alarm corresponds to a fourth status 940 (TARGET). As mentioned earlier in FIG. 9, an alarm corresponding to the fourth status 940 can be a target of alarm scheduling.

The data scheduler 182 determines alarm time for waking the first application 171 up using the first alarm and transmits an eleventh signal including the determined alarm time to the alarm service module 181 [S1240]. Since a method for the data scheduler 182 to determine the alarm time is mentioned earlier in FIG. 7 detail explanation on the method is omitted at this time.

If it reaches at the determined alarm time, the alarm service module 181 can wake the first application 171 up in response to the eleventh signal [S1250].

The first application 171 is woke up by the alarm service module 181 using the first alarm and transmits a packet to a server to notify that the mobile terminal 100 is connected with a corresponding service. Or, the first application can perform data synchronization by transceiving data with the server [S1260].

Meanwhile, the alarm service module 181 transmits a twelfth signal to the data scheduler 182 to indicate that the first application 171 woke up by the first alarm [S1270]. The step S1270 is performed after the step S1250, is simultaneously performed together with the step S1250, or can be performed with the step S1250 in a manner of being partly overlapped in time.

As mentioned earlier in FIG. 9, if the status provided to the information on the first alarm corresponds to the fourth status 940, since the first alarm becomes a target of alarm scheduling irrespective of whether or not a next match-event for the first alarm is detected, the data scheduler 182 may not monitor whether or not data communication for transceiving a packet between the first application 171 and a server is performed. Although the data scheduler 182 monitors whether or not data communication for transceiving a packet between the first application 171 and a server is performed, the data scheduler 182 is able to maintain the fourth status 940 provided to the information on the first alarm as it is.

Figure 13:
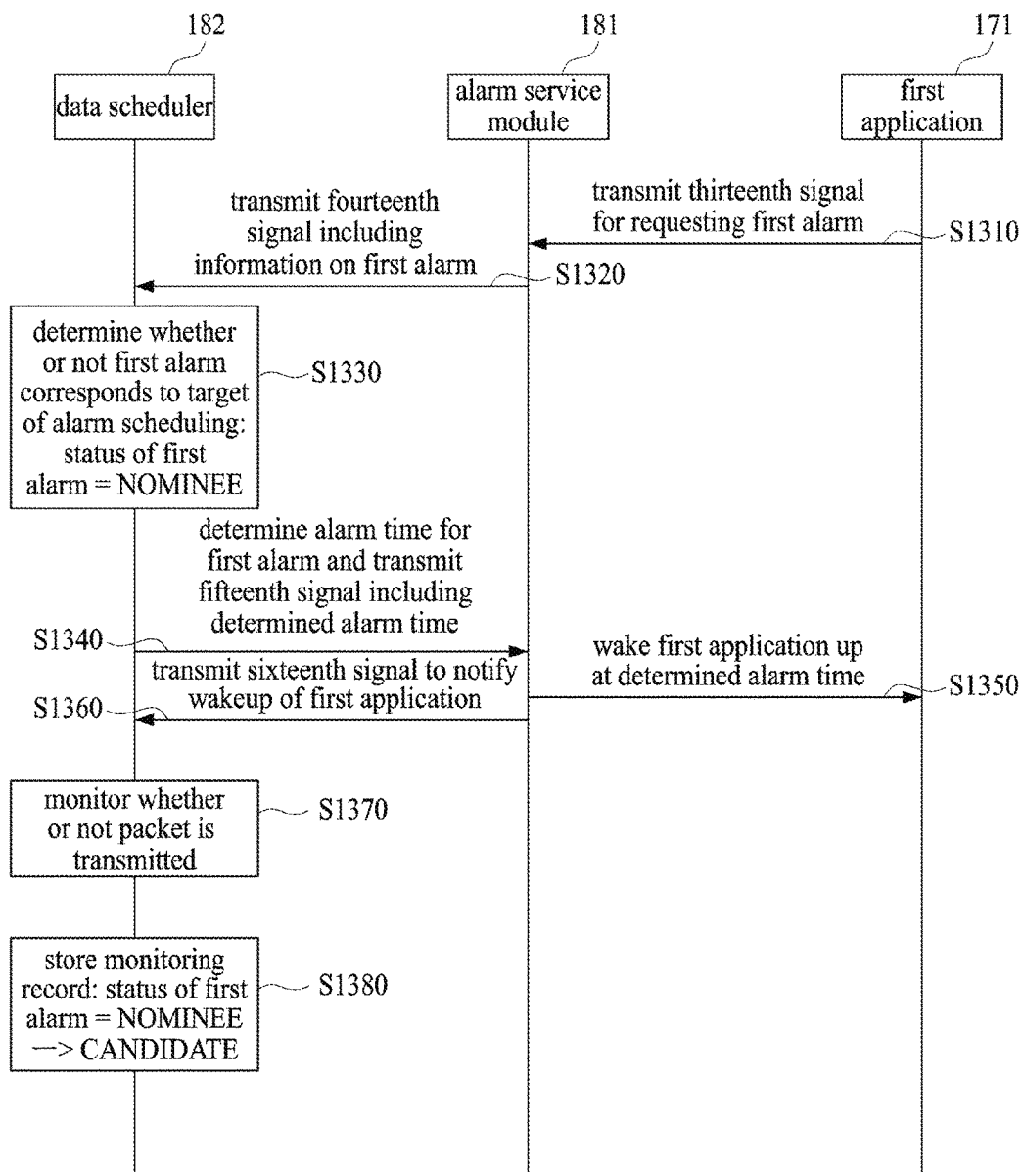
FIG. 13 is a flowchart for explaining a different example of an embodiment capable of being performed after the embodiment of FIG. 11 in a mobile terminal according to one embodiment of the present invention.

FIG. 13 is a flowchart for explaining a different example of an embodiment capable of being performed after the embodiment of FIG. 11 in a mobile terminal according to one embodiment of the present invention.

The first application 1717 transmits a thirteenth signal for requesting a first alarm to the alarm service module 181 [S1310]. The thirteenth signal can include information on the first alarm. For example, the information on the first alarm can include at least one of first information for identifying the first alarm and information on alarm time at which the first application 171 wakes up according to a predetermined alarm period related to the first alarm.

The alarm service module 181 transmits a fourteenth signal including the information on the first alarm to the data scheduler 182 in response to the thirteenth signal [S1320]

The data scheduler 182 determines whether or not the first alarm becomes a target of alarm scheduling [S1330]. The data scheduler 182 can determine whether or not the first alarm becomes a target of alarm scheduling based on a monitoring record stored in the data scheduler 182 in advance in a manner of being mapped to the information on the first alarm. For example, the data scheduler 182 checks a status provided to the information on the first alarm to determine whether or not the first alarm becomes a target of alarm scheduling. In the present embodiment, assume that the status provided to the information on the first alarm corresponds to a third status 930 (NOMINEE). As mentioned earlier in FIG. 9, an alarm corresponding to the third status 930 can be a target of alarm scheduling.

The data scheduler 182 determines alarm time for waking the first application 171 up using the first alarm and transmits a fifteenth signal including the determined alarm time to the alarm service module 181 [S1340]. Since a method for the data scheduler 182 to determine the alarm time is mentioned earlier in FIG. 7 detail explanation on the method is omitted at this time.

If it reaches at the determined alarm time, the alarm service module 181 can wake the first application 171 up in response to the fifteenth signal [S1350].

The first application 171 is woke up by the alarm service module 181 using the first alarm [S1350]. In the present embodiment, although the first application 171 is work up by the first alarm, assume that the first application 171 does not perform data communication for transceiving a packet with the server.

Meanwhile, the alarm service module 181 transmits a sixteenth signal to the data scheduler 182 to indicate that the first application 171 woke up by the first alarm [S1360]. The step S1360 is performed after the step S1350, is simultaneously performed together with the step S1350, or can be performed with the step S1350 in a manner of being partly overlapped in time.

The data scheduler 182 monitors whether or not data communication for transceiving a packet between the first application 171 and the server is performed in response to the sixteenth signal [S1370]. The data scheduler 182 is able to monitor whether or not the first application transmits a packet to the server or whether or not the first application 171 receives a packet from the server via the wireless communication unit 110 during a predetermined time after the sixteenth signal is received, i.e., during a prescribed time after the first application 171 woke up at the alarm time in response to the fifteenth signal.

After the first application 171 woke up, if data communication is not performed between the first application 171 and the server, the data scheduler 182 can store the information on the first alarm in a manner of mapping the information to a monitoring record [S1380]. In this case, the information on the first alarm may correspond to first information capable of identifying the first alarm.

After the first application 171 woke up, if data communication is not performed between the first application 171 and the server, the data scheduler 182 detects that a match-event for the first alarm of the first application 171 does not occur and may change the status provided to the information on the first alarm with one-step lower status based on the monitoring record information stored in the data scheduler 182 in a manner of being mapped to the information on the first alarm of the first application. In the present embodiment, since the monitoring record information, which is stored in the data scheduler 182 in a manner of being mapped to the information on the first alarm of the first application, corresponds to information indicating that the third status 930 is provided to the information on the first alarm, the data scheduler 182 can provide a second status 920 (CANDIDATE) to the information on the first alarm.

Figure 14:
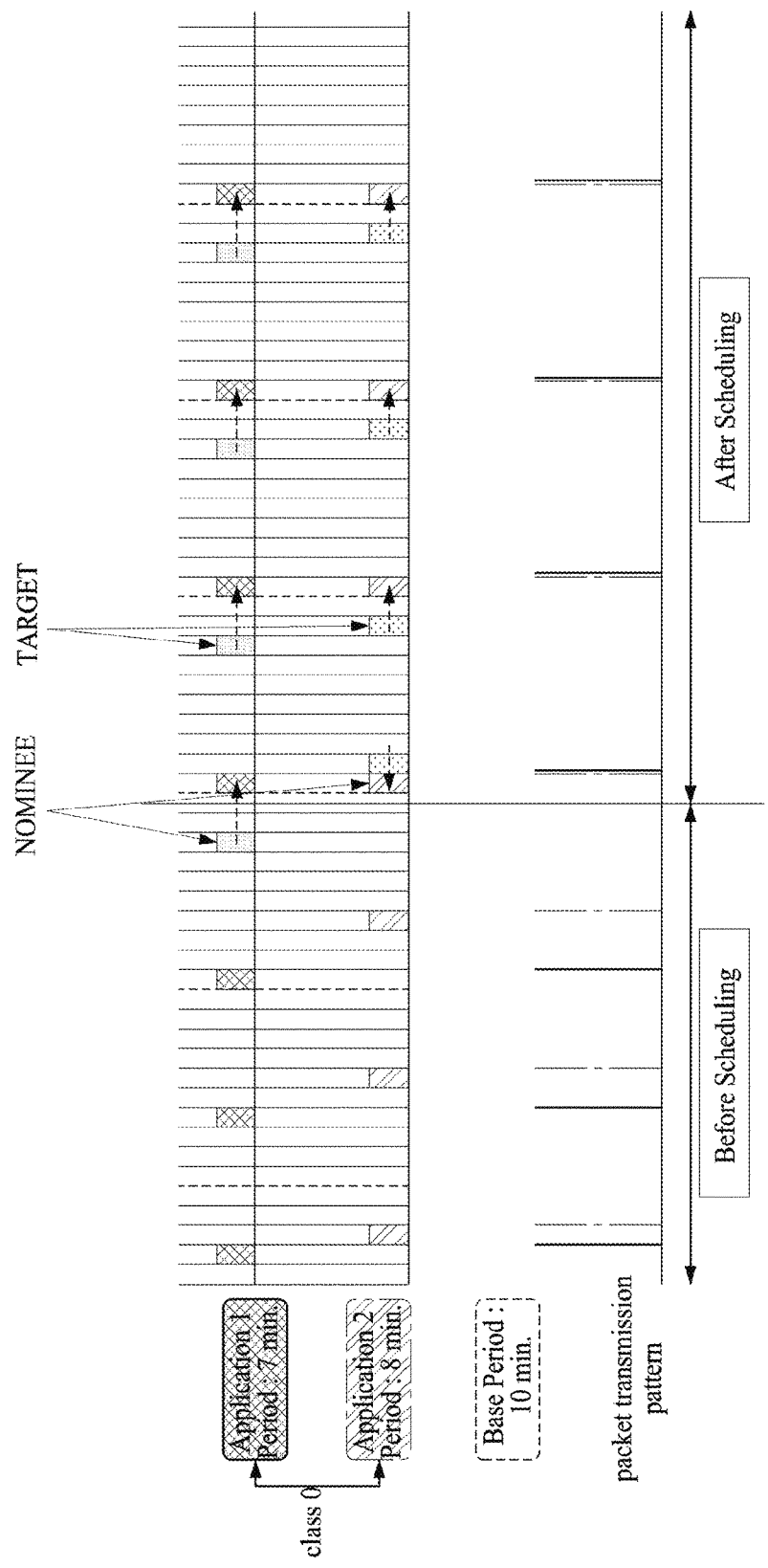
FIG. 14 is a diagram for explaining a control result of alarm periods of applications belonging to the same class in a mobile terminal according to one embodiment of the present invention.

FIG. 14 is a diagram for explaining a control result of alarm periods of applications belonging to the same class in a mobile terminal according to one embodiment of the present invention.

In FIG. 14, a first application and a second application are explained as an example of an application becoming a target of alarm scheduling. Assume that a predetermined alarm period of the first application corresponds to 7 minutes, a predetermined alarm period of the second application corresponds to 8 minutes, and a predetermined base period (BP) corresponds to 10 minutes. As mentioned earlier in FIG. 7, assume that both the first application and the second application belong to a class 0.

The data scheduler 182 can determine alarm time to make all applications belonging to the same class wake up in every period. For example, the data scheduler 182 can determine alarm time to make applications wake up in every (N+1)*BP period.

If a status provided to information on an alarm of each application corresponds to a third status 930 (NOMINEE), the data scheduler 182 can control an alarm period of each application by delaying or advancing alarm time at which each application wakes up.

Referring to FIG. 14, before an alarm is scheduled, the first application and the second application separately wake up according to an alarm period of its own and respectively transmit a packet to a server. On the contrary, after an alarm is scheduled, both the first application and the second application wake up in every base period (BP) and transmit a packet to the server. By doing so, the mobile terminal 100 can reduce power consumed for synchronizing data of applications, thereby enhancing power efficiency.

Figure 15:
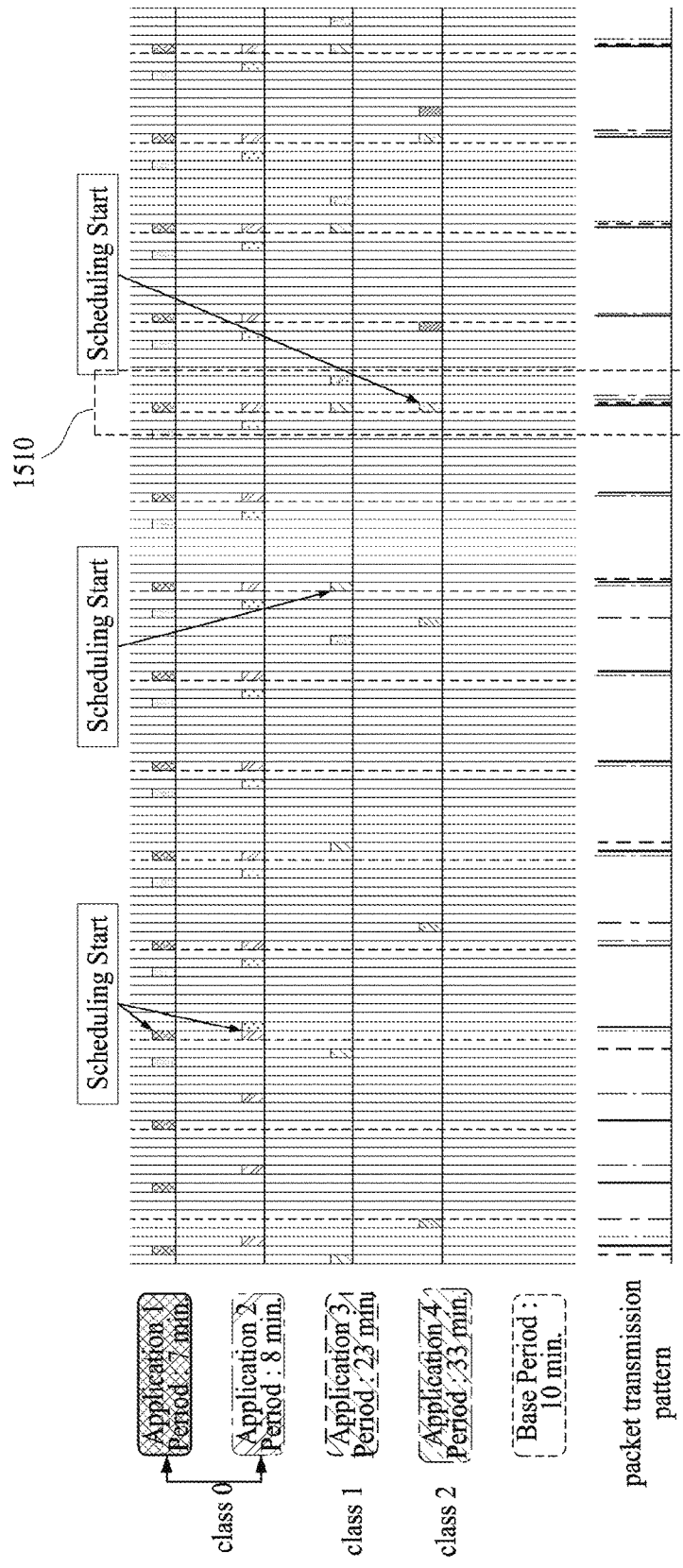
FIG. 15 is a diagram for explaining a control result of alarm periods of applications belonging to a different class in a mobile terminal according to one embodiment of the present invention.

FIG. 15 is a diagram for explaining a control result of alarm periods of applications belonging to a different class in a mobile terminal according to one embodiment of the present invention.

In FIG. 15, a first application, a second application, a third application, and a fourth application are explained as an example of an application becoming a target of alarm scheduling. Assume that a predetermined alarm period of the first application corresponds to 7 minutes, a predetermined alarm period of the second application corresponds to 8 minutes, a predetermined alarm period of the third application corresponds to 23 minutes, a predetermined alarm period of the fourth application corresponds to 33 minutes, and a predetermined base period (BP) corresponds to 10 minutes. As mentioned earlier in FIG. 7, assume that both the first application and the second application belong to a class 0, the third application belongs to a class 1, and the fourth application belongs to a class 2.

The data scheduler 182 can determine alarm time to make all applications wake up in every period of an integer multiple of the base period (BP). The data scheduler 182 can determine alarm time to make all applications belonging to the same class wake up at the same time in every period. For example, the data scheduler 182 can determine alarm time to make applications wake up in every (N+1)*BP period.

If a status provided to information on an alarm of each application corresponds to a third status 930 (NOMINEE), the data scheduler 182 can control an alarm period of each application by delaying or advancing alarm time at which each application wakes up.

Referring to FIG. 15, the first application and the second application wake up in every base period (BP) to transmit a packet, the third application wakes up in every period longer than the base period (BP) as much as two times to transmit a packet, and the fourth application wakes up in every period longer than the base period (BP) as much as three times to transmit a packet. All of the four applications become a target of alarm scheduling from a period of the reference number 1510. Although all applications do not wake up in the same period, the applications can wake up in a period of an integer multiple of the base period (BP), thereby enhancing power efficiency.

According to the embodiments of the present invention, it is able to provide a mobile terminal capable of reducing consumed power by controlling an alarm period for waking up an application performing synchronization with a server and a method of controlling therefor.

According to the embodiments of the present invention, it is able to provide a solution for controlling an alarm period of an application.

The present invention may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

INDUSTRIAL APPLICABILITY

The present invention relates to a mobile terminal and a method of controlling therefor and is industrially usable.

What is claimed is:

1. A mobile terminal, comprising:
a memory configured to store a plurality of applications performing synchronization by waking up in a predetermined alarm period; and
a controller operably coupled to the memory and comprising:
a data scheduler configured to control the predetermined alarm period by determining an alarm time for waking each application up according to a predetermined condition; and
an alarm service module configured to:
wake each application up at the alarm time determined by the data scheduler;
receive a first signal for requesting a specific alarm for wakeup from a first application among the plurality of the applications; and
transmit a second signal including information on the specific alarm to the data scheduler in response to the received first signal,
wherein the data scheduler is further configured to:
determine an alarm time for waking the first application up based on the information on the specific alarm when the specific alarm relates to data communication for transceiving a packet with a server; and
transmit the determined alarm time for waking the first application up to the alarm service module,
wherein:
the alarm service module is further configured to wake each of the plurality of the applications up at a period of an integer multiple of a predetermined base period (BP);

the data scheduler is further configured to classify each of the plurality of applications into an application belonging to a class among class N (N=0, 1, 2, . . . ) based on the predetermined base period and the predetermined alarm period of a respectively corresponding application; and
class (N) of each application is determined by the following equation 1:

$$(N-0.5)*BP < \text{alarm period} \le (N+0.5)*BP, \quad \text{Equation 1:}$$

where N is a positive integer, BP is a predetermined base period, and alarm period is an alarm period preset to each application.

2. The mobile terminal of claim 1, wherein applications belonging to class 0 satisfy the following equation 2:

$$5 \text{ min.} < \text{alarm period} \le (N+0.5)*BP. \quad \text{Equation 2:}$$

3. The mobile terminal of claim 1, wherein the information on the specific alarm includes: first information for identifying the specific alarm of the first application; and second information on alarm time at which the first application wakes up according to the predetermined alarm period related to the specific alarm.

4. A method for controlling a mobile terminal comprising an alarm service module and a data scheduler in a controller, the method comprising:
storing, in a memory, a plurality of applications performing synchronization by waking up in a predetermined alarm period;
controlling, by the data scheduler, the predetermined alarm period by determining an alarm time for waking each application up according to a predetermined condition;
waking each application up, by the alarm service module, at the alarm time determined by the data scheduler;
receiving, by the alarm service module, a first signal for requesting a specific alarm for wakeup from a first application among the plurality of the applications;
transmitting, by the alarm service module, a second signal including information on the specific alarm to the data scheduler in response to the received first signal;
determining, by the data scheduler, an alarm time for waking the first application up based on the information on the specific alarm when the specific alarm relates to data communication for transceiving a packet with a server;
transmitting, by the data scheduler, the determined alarm time for waking the first application up to the alarm service module;
waking each of the plurality of the applications up, by the alarm service module, at a period of an integer multiple of a predetermined base period (BP); and
classifying, by the data scheduler, each of the plurality of applications into an application belonging to a class among class N (N=0, 1, 2, . . . ) based on the predetermined base period and the predetermined alarm period of a respectively corresponding application,
wherein class (N) of each application is determined by the following equation 1:

$$(N-0.5)*BP < \text{alarm period} \le (N+0.5)*BP, \quad \text{Equation 1:}$$

where N is a positive integer, BP is a predetermined base period, and alarm period is an alarm period preset to each application.

5. The method of claim 4, wherein applications belonging to class 0 satisfy the following equation 2:

$$5 \text{ min.} < \text{alarm period} \leq (N+0.5)*BP. \qquad \text{Equation 2:}$$

6. The method of claim 4, wherein the information on the specific alarm comprises:
- first information for identifying the specific alarm of the first application: and
- second information on alarm time at which the first application wakes up according to the predetermined alarm period related to the specific alarm.

* * * * *